United States Patent
Neill

(10) Patent No.: US 8,626,733 B2
(45) Date of Patent: Jan. 7, 2014

(54) SYSTEM AND ASSOCIATED METHODS FOR REMOTELY ENABLING FEATURES

(75) Inventor: Richard W. Neill, Syosset, NY (US)

(73) Assignee: CSC Holdings, LLC, Bethpage, NY (US)

(*) Notice: Subject to any disclaimer, the term of this patent is extended or adjusted under 35 U.S.C. 154(b) by 0 days.

(21) Appl. No.: 12/721,847

(22) Filed: Mar. 11, 2010

(65) Prior Publication Data

US 2010/0169368 A1 Jul. 1, 2010

Related U.S. Application Data

(63) Continuation of application No. 11/017,794, filed on Dec. 22, 2004, now Pat. No. 7,716,237.

(51) Int. Cl.
*G06F 17/30* (2006.01)

(52) U.S. Cl.
USPC .............. 707/705; 707/769; 707/821; 725/2; 725/4

(58) Field of Classification Search
USPC ............ 707/769, 705, 821; 709/220; 725/2, 4
See application file for complete search history.

(56) References Cited

U.S. PATENT DOCUMENTS

| | | | |
|---|---|---|---|
| 5,410,326 A * | 4/1995 | Goldstein | 348/734 |
| 5,517,257 A * | 5/1996 | Dunn et al. | 348/734 |
| 5,570,295 A * | 10/1996 | Isenberg et al. | 379/90.01 |
| 5,619,250 A * | 4/1997 | McClellan et al. | 725/132 |
| 5,689,708 A * | 11/1997 | Regnier et al. | 709/229 |
| 5,954,808 A * | 9/1999 | Paul | 710/104 |
| 5,982,363 A * | 11/1999 | Naiff | 715/721 |
| 5,990,927 A * | 11/1999 | Hendricks et al. | 725/132 |
| 6,020,863 A * | 2/2000 | Taylor | 345/3.1 |
| 6,259,443 B1 * | 7/2001 | Williams, Jr. | 715/741 |
| 6,351,773 B1 * | 2/2002 | Fijolek et al. | 709/228 |
| 6,425,125 B1 * | 7/2002 | Fries et al. | 717/168 |
| 6,618,858 B1 * | 9/2003 | Gautier | 725/132 |
| 6,718,374 B1 * | 4/2004 | Del Sordo et al. | 709/220 |
| 6,732,179 B1 * | 5/2004 | Brown et al. | 709/229 |
| 6,742,121 B1 * | 5/2004 | Safadi | 713/187 |
| 6,745,245 B1 * | 6/2004 | Carpenter | 709/229 |
| 6,775,713 B1 * | 8/2004 | Liu et al. | 709/250 |
| 6,813,778 B1 * | 11/2004 | Poli et al. | 725/132 |

(Continued)

FOREIGN PATENT DOCUMENTS

WO WO 2004/008291 A2 * 1/2004

OTHER PUBLICATIONS

Rath, Kamlesh, et al., "Set-top Box Control Software: A Key Component in Digital Video", Philips Journal of Research, vol. 50, Issues 1-2, © 1996, pp. 185-199.*

(Continued)

*Primary Examiner* — John Breene
*Assistant Examiner* — Andalib Lodhi
(74) *Attorney, Agent, or Firm* — Goodwin Procter LLP

(57) ABSTRACT

A method and apparatus enables a feature among a plurality of features in an application loaded on a client, with the client located remotely from a server. The server receives a data profile request from the client. In response to the data profile request, a data profile is sent from the server to the client, the data profile including a profile key to identify the client, an application identification to identify the application, and a feature selector. The application uses the feature selector to enable the feature among the plurality of features.

21 Claims, 5 Drawing Sheets

(56) References Cited

U.S. PATENT DOCUMENTS

| | | | |
|---|---|---|---|
| 7,631,325 B2* | 12/2009 | Rys et al. | 725/25 |
| 7,681,043 B1* | 3/2010 | Carr | 713/189 |
| 2001/0049718 A1* | 12/2001 | Ozawa | 709/203 |
| 2002/0059594 A1* | 5/2002 | Rasmussen et al. | 725/37 |
| 2002/0120932 A1* | 8/2002 | Schwalb | 725/37 |
| 2002/0184652 A1* | 12/2002 | Cezeaux | 725/132 |
| 2003/0084440 A1* | 5/2003 | Lownes | 725/6 |
| 2003/0169289 A1* | 9/2003 | Holt et al. | 345/735 |
| 2004/0107439 A1* | 6/2004 | Hassell et al. | 725/44 |
| 2004/0107443 A1* | 6/2004 | Clancy | 725/100 |
| 2004/0194079 A1* | 9/2004 | Nguyen et al. | 717/168 |
| 2005/0058066 A1* | 3/2005 | Sung | 370/229 |
| 2005/0108772 A1* | 5/2005 | Crinon et al. | 725/134 |
| 2005/0114900 A1* | 5/2005 | Ladd et al. | 725/100 |
| 2005/0160473 A1* | 7/2005 | Gal-Oz | 725/118 |
| 2005/0212504 A1* | 9/2005 | Revital et al. | 324/100 |
| 2005/0235319 A1* | 10/2005 | Carpenter et al. | 725/52 |
| 2005/0235329 A1* | 10/2005 | Karaoguz et al. | 725/81 |
| 2005/0237270 A1* | 10/2005 | Adams et al. | 345/2.1 |
| 2006/0020993 A1* | 1/2006 | Hannum et al. | 725/111 |
| 2006/0035631 A1* | 2/2006 | White et al. | 455/418 |
| 2006/0101495 A1* | 5/2006 | Yoshida et al. | 725/78 |
| 2010/0318731 A1* | 12/2010 | Murray | 711/104 |

OTHER PUBLICATIONS

Bissell, R. A., et al., "The Set-top Box for Interactive Services", BT Technol. J., vol. 13, No. 4, Oct. 1995, pp. 66-77.*

Pekowsky, Stuart, et al., "The Set-Top Box as Multi-Media Terminal", IEEE Transactions on Consumer Electronics, vol. 44, Issue 3, Aug. 1998, pp. 833-840.*

Peng, C., et al., "Digital Television Application Manager", 2001 International Conf. on Multimedia and Expo, Tokyo, Japan, Aug. 22-25, 2001, pp. 685-688.*

Rath, Kamlesh, et al., "Set-Top Box Control Software: A Key Component in Digital Video", Philips Journal of Research, vol. 50, No. 1/2, © 1996, pp. 185-199.*

Lonczewski, Frank, et al., "An extensible Set-Top-Box Architecture for interactive and broadcast Services offering sophisticated User Guidance", ICME 2000, New York, NY, vol. 3, © 2000, pp. 1403-1406.* de Lange, Fons, "The Philips-Open TV Product Family Architecture for Interactive Set-Top Boxes", PFE-4 2001, LNCS 2290, Springer-Verlag, Berlin, Germany, © 2002, pp. 187-206.*

* cited by examiner

SYSTEM AND ASSOCIATED METHODS FOR REMOTELY ENABLING FEATURES

CROSS-REFERENCE TO RELATED APPLICATIONS

This application is a continuation of U.S. application Ser. No. 11/017,794, filed Dec. 22, 2004, which is incorporated by reference in its entirety.

TECHNICAL FIELD

The present invention relates to systems and methods for remotely enabling one or more features. The features may be features in an application loaded on a client, which are remotely enabled from a server.

BACKGROUND OF THE INVENTION

Devices such as cell phones, PDAs, cable boxes and other devices often have a plurality of features that a particular user may or may not desire to use with the device. These features may be included within an application, such as a software application, stored in memory on the device, such that they may be selectively activated. A user will usually select such features upon purchasing the device, such as with a cell phone, or upon signing up for a service, such as with cable television. The features are typically set in the device before it is given to the user. It would be advantageous if the features could be selectively enabled and/or disabled from a remote location.

Providers of video, audio, or other content, such as phone or cable companies, are converting from analog delivery systems to more sophisticated digital delivery systems. These systems are being deployed, and will, over time, phase out the analog delivery systems. For example, cable companies are offering digital set top boxes to customers, that offer more viewing choices to the customer. These digital set top boxes may offer additional features and services such as additional channels, interactive user interfaces, digital programming, pay-per view, video-on-demand, subscription video-on-demand, etc.

Many providers of such video content provide to users in more than one geographic area. The providers are now offering content such as weather or traffic conditions that may be different for users in different geographic areas. It would be beneficial if this information could be individualized to the particular customer.

Additionally, such content providers may employ diagnostics in a set top box provided to the customer. This often involves pre-installing diagnostic software or code on each set top box, or downloading the diagnostics to each set top box. As the diagnostics become more and more complex, often with multiple levels of diagnostics, the software uses more memory and computational resources. The diagnostics are often run from a remote location, such as a head end. Such use makes it difficult to program each user's box individually with the appropriate level of diagnostics. It would be advantageous if different levels of diagnostics could be selectively enabled and disabled from a remote location.

SUMMARY OF THE INVENTION

A method and apparatus enables a feature among a plurality of features in an application loaded on a client, with the client located remotely from a server. The server receives a data profile request from the client. In response to the data profile request, a data profile is sent from the server to the client, the data profile including a profile key to identify the client, an application identification to identify the application, and a feature selector. The application uses the feature selector to enable the feature among the plurality of features.

DETAILED DESCRIPTION

The present invention enables a feature among a plurality of features in an application loaded on a client, with the client located remotely from a server. The server receives a data profile request from the client. In response to the data profile request, a data profile is sent from the server to the client, the data profile including a profile key to identify the client, an application identification to identify the application, and a feature selector. The application uses the feature selector to enable the feature among the plurality of features.

Figure 1:
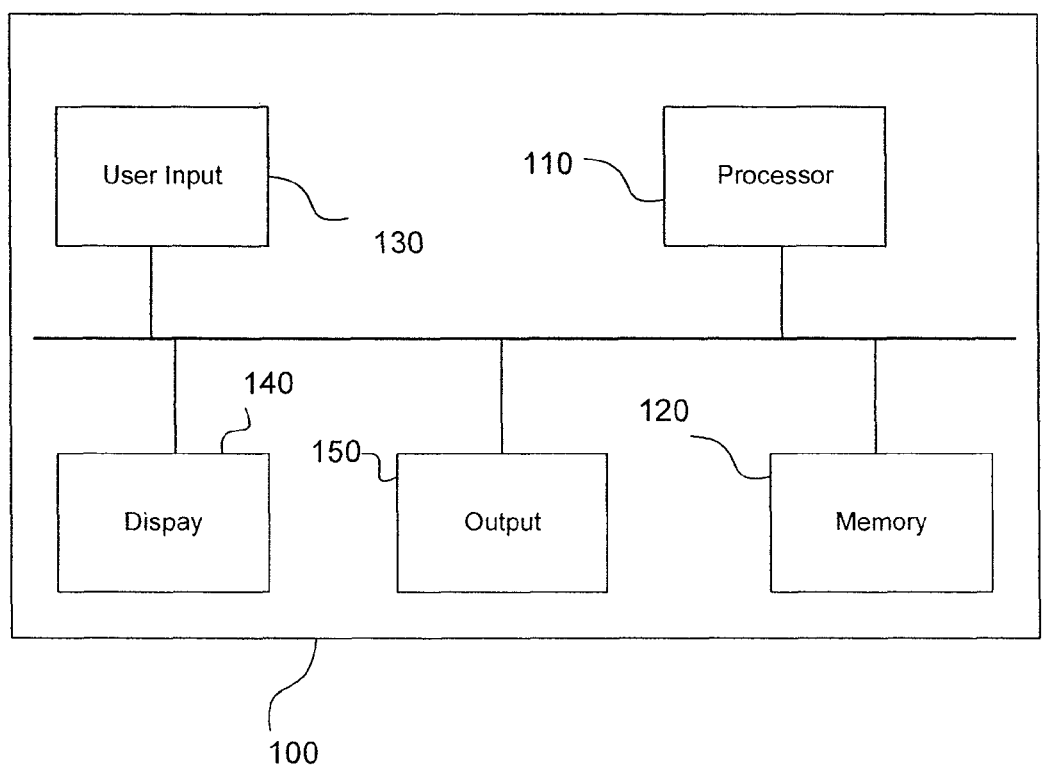
FIG. 1 is a block diagram in accordance with an embodiment of the present invention.

FIG. 1 depicts a block diagram of an embodiment of the present invention. Computing device 100 is suitable for use with the present invention. The computing device 100 may include a processor 110, a memory 120, an user input 130, a display 140, and an output 150. The memory 120 may contain software to be run in conjunction with processor 110, and may cause images to be displayed on display 140. The software is specifically designed to cause computing device 100 to implement the present invention. Computing device 100 may be one of various types of computing devices, such as a workstation, a personal computer, a server, a head-end in a cable system, set top box, home media gateway, or any other type of computing device.

The processor 110 may be a general-purpose microprocessor, such a Pentium series microprocessor manufactured by the Intel Corporation of Santa Clara, Calif. In another embodiment, the processor 110 can be an Application Specific Integrated Circuit (ASIC), which has been designed to implement in its hardware and/or firmware at least a part of a method in accordance with embodiments of the present invention.

Memory 120 can be any device capable of storing analog or digital information, such as a hard disk, Random Access Memory (RAM), Read Only Memory (ROM), flash memory, a compact disk, a magnetic tape, a floppy disk, and any combination thereof, for example.

User input 130 can be any type of input device, such as a keyboard, keypad, pointing device, microphone, mouse, wired or wireless remote control, touch pad, touch screen, a port(s) to attach other input devices, voice recognition software, etc. Any type of input device will function in accordance with embodiments of the present invention.

The display 140 can be any type of display or screen that is capable of displaying images. For example, the display may be a CRT or LCD monitor, a heads-up display, a television, etc. The display 140 may be structurally included as part of the electronic device, or may be physically separated from but connected with the other components of device 100, such as a monitor in a desktop computer. The output 150 can be any type of output, such as a serial port, a wireless output, a connection to a cable modem, an infrared output, etc.

Figure 2:
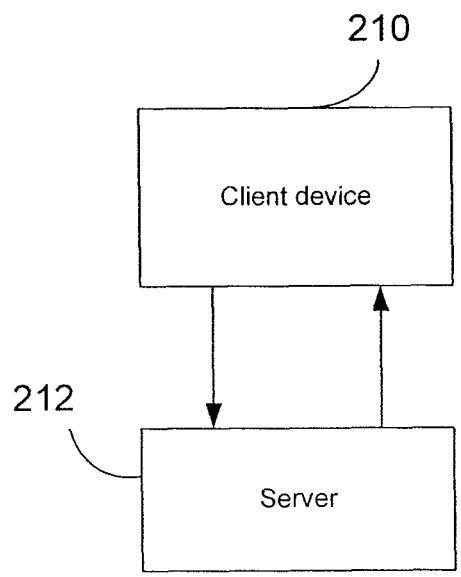
FIG. 2 is a block diagram in accordance with an embodiment of the present invention.

FIG. 2 depicts a block diagram of an embodiment of the present invention. The client device 210 may correspond to the computing device 100 of FIG. 1, and may include a processor 110, the memory 120, the user input 130, the display 140, and the output 150, as well as other computer elements. The server 220 may include the same elements. The client device 210 may be programmed with software in memory to carry out the present invention. The client device 210 is remote from the server 212. The client device may be a device such as a cell phone, a set top box in a cable television system, a PDA, a computer, or other type of electronic device. The server 212 may be a server located at a service provider location, for example, or another server programmed to carry out the present invention. For example, the server 212 could be a server located at a mobile phone service provider location, an Internet service provider location, or a cable television service provider location. The server 212 may communicate with the client device 210 in any way, such as wirelessly, over satellite, over telephone lines, over a cable television connection, etc. The means of communication between the client device 210 and the server 212 is not a critical part of the invention. The server 212 may be connected to a plurality of the client devices in a network.

The present invention allows a user to select features to be enabled. The user may select such features using the user input 130 in conjunction with display 140 by accessing programming that has been loaded into memory 120, with the programming being run by processor 110. For example, the user may be able to call up a display of available features, and select one or more features that the user wishes to be enabled. In response to such a selection of one or more features, the programming loaded into the client device 210 will generate a data profile request, which is sent to the server 212. The data profile request will indicate which client device is sending the data profile request, and which features are desired to be enabled. As an alternative, the data profile request could be sent from the client device 210 to the server every time the client device is powered up, for example.

The client device may include one or more applications, which may be in the form of computer programs, stored in the memory 120. The applications may be stored on the client device 210 in advance, or may be downloaded or otherwise loaded into the client device at a later time. The applications may include features that are selectively enabled on the client device 210.

Upon receipt of the data profile request at the server 212, the server 212 generates a data profile, which includes a profile key, an application key, and a feature selector. The profile key identifies which client the data request is generated for. Thus, if the data profile is broadcast to a plurality of clients in a network such as a mobile phone or cable television network, each client will check the profile key to determine if it is destined for that particular client device. If it is not destined for that particular client device, it is disregarded and not used.

If the profile key indicates that it is designated for that particular client device, the client device 210 will examine the application identification to determine which among a plurality of applications it may apply to. Then, the client device will examine the feature selector included in the data profile, to determine which features should be enabled. The programs on the client device will then enable the desired features The present invention may also be used to enabled features that are not selected at the client device 210, but are selected at the server 212. For example, when the client device is powered on, it may send a data profile to the server 212, which will identify the client device. The server may be used to selectively enable features at one client device or at group of client devices. For example, it may be determined that all client devices in a particular area should have a feature enabled. Such a feature could be a display of weather data or other data particular to that geographical area. In this case, the profile key could include identifying information particular to the geographical area, such as zip code, or could include an identification code for each client device 212. The feature may then be enabled at each client device 210.

This invention is particularly useful for remote diagnostics. For example, an application loaded on the client device may be a remote diagnostics application. The application may contain a plurality of diagnostic levels. The diagnostic levels may be prestored in memory of the client device 210, or may be loaded therein from the server 212 or from another location. In this way, the server can remotely set different diagnostic levels to be run on the client device 210. For example, the server 212 may access the client 210 and send a first diagnostic level. The server 212 may send a second diagnostic level. Any number of such diagnostic levels may be used. The server 212 may then receive from the client device results of the diagnostics and continue other diagnostic levels as required.

Figure 3:
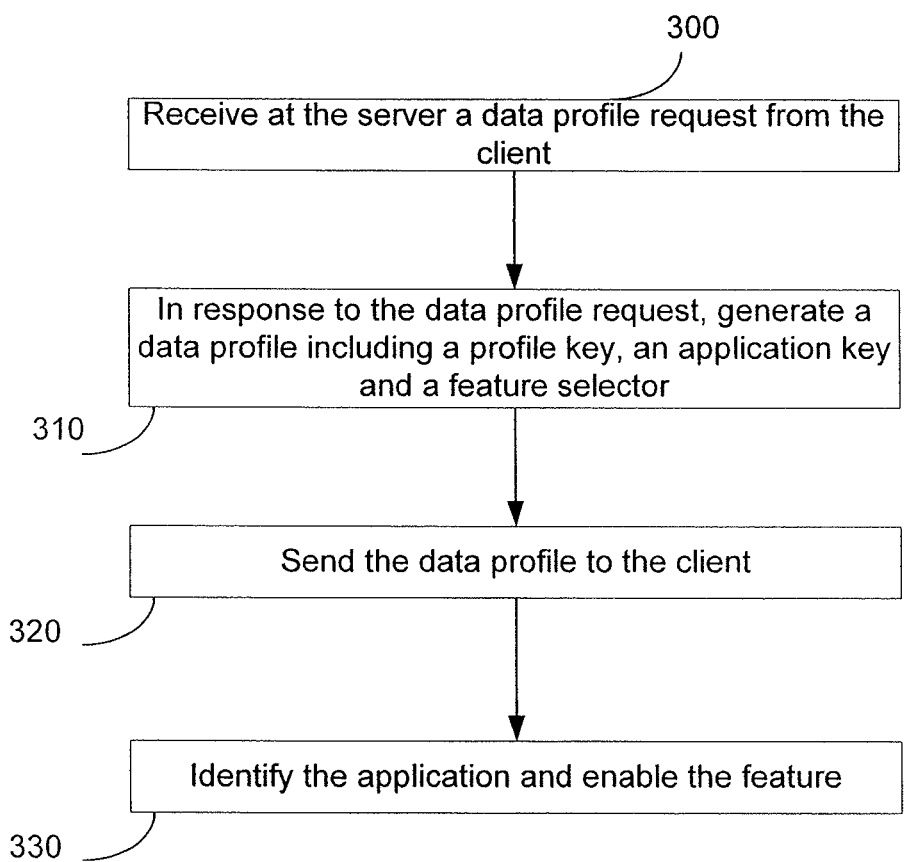
FIG. 3 is a flowchart in accordance with an embodiment of the present invention.

FIG. 3 is a flow chart illustrating steps carried out by an embodiment of the present invention. In step 300, the client device sends a data profile request to the server. As explained above, the data profile request will identify the client, and may include an indication of a feature or features that need to be enabled.

In step 310, in response to the data profile request, the server generates a data profile. The data profile includes a profile key, an application key and a feature selector. The profile key identifies the particular client, so that if the server is connected to more than one client, the client can determine whether the data profile is for that particular client. The profile key may identify more than one client. The application key identifies a particular application, so that if more than one application is on the client, the appropriate application made be determined. The feature selector identifies which feature should be enabled by the client. The server may generate more than one data profile, and may broadcast the data profile to multiple clients in a network, for example.

Figure 4:
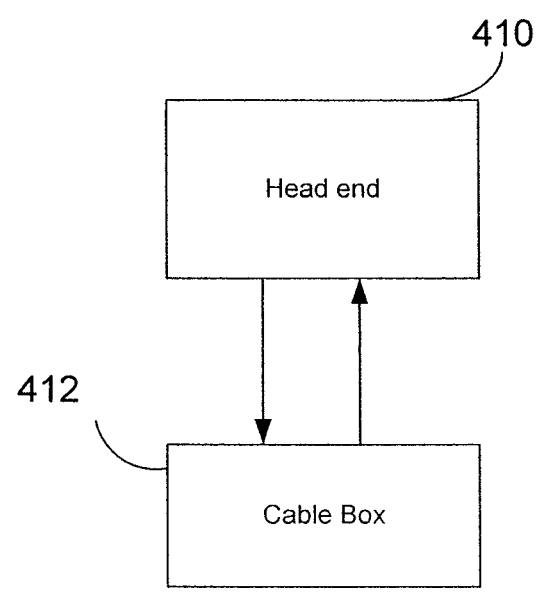
FIG. 4 is a block diagram in accordance with an embodiment of the present invention.

FIG. 4 illustrates a block diagram of an embodiment of the present invention. In this embodiment that is used with a cable television system, a head end 410 corresponds to the remote computing device 210 of FIG. 2. The head end may 410 comprise a server such as the one illustrated in FIG. 2, or may be another type of computing device. The head end and the cable box 412 may each comprise a computing device such as computing device 100, and may include additional computing elements. The head end 410 is located remotely from cable box 412, which is typically located at a user premises. The cable box 412 could alternatively be a type of device such as a personal computer, etc. The head end 410 and the cable box 412 carry out the process described below in conjunction with FIG. 5 so as to enable features on cable box 412.

Figure 5:
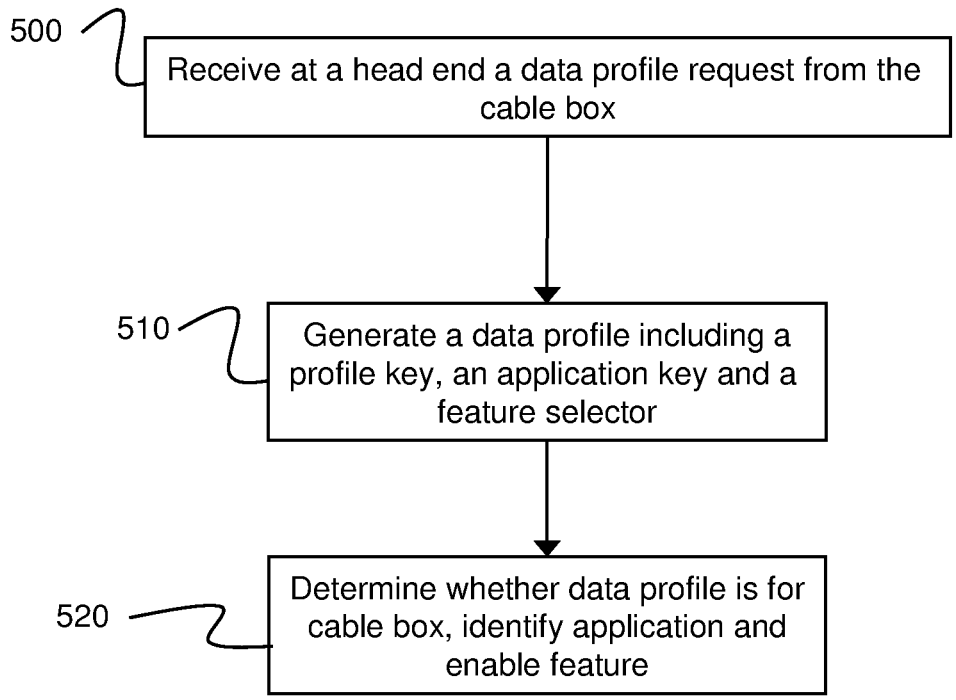
FIG. 5 is a flowchart in accordance with an embodiment of the present invention.

FIG. 5 illustrates a flowchart in accordance with embodiments of the present invention. In step 500, the present invention sends a data profile request from the cable box 412 to the head end 410 at a remote location. The data profile may be sent when the cable box 412 is powered on, at regular intervals, when a user indicates that a new feature or service is desired, or at other times. As described above, the head end 410 may be accessed by any means.

In step 510, the head end 410 receives the data profile request, and generates the data profile, which is sent to the cable box 412. The data profile includes the profile key, the application key and the feature selector as described above.

In step 520, the cable box 412 determines whether the data profile should be used, by examining the profile key as described above. If the data key indicates that the data profile is for that particular cable box, the cable box 412 examines the application key to determine which application should be used, and uses the feature selector to enable the appropriate feature.

In the embodiments described herein, the data profile request, and the data profile, including the profile key, the application key and the feature selector may be implemented in various known ways to send the appropriate information. For example, these items may be sent in a digital message, with certain portions of the message designated to include each of the required bits of information. The information may then be appropriately determined by the above-described computing elements and appropriate software using methods well known to those of ordinary skill in these arts.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method of enabling a particular feature among a plurality of features contained in a software application loaded on one or more set-top boxes in a cable system, the one or more set-top boxes located remotely from a head-end in the cable system, the method comprising:

at the head-end, receiving from a first requesting set-top box a first data profile request indicating one or more of a plurality of features contained in the software application to be enabled thereon;

at the head-end, receiving from a second requesting set-top box a second data profile request indicating one or more of a plurality of features contained in the software application to be enabled thereon, wherein at least one of the software applications and the one or more features contained therein in the second data profile request differs from at least one of the software applications and the one or more features contained therein in the first data profile request;

at the head-end, generating and transmitting a first data profile based on the first data profile request and a second data profile based on the second data profile request, each data profile comprising:

a profile key identifying a sub-set of requesting set-top boxes each having loaded thereon a plurality of software applications for implementing one or more features, an application key identifying a corresponding software application having one or more features to be enabled, and a feature selector identifying the one or more features contained in the software application to be enabled;

at the first requesting set-top box, enabling the one or more identified features contained in the identified software application by sending the data profile from the head-end to the plurality of set-top boxes such that each of the sub-set of requesting set-top boxes uses the first data profile after ascertaining that the profile key contained in the first data profile corresponds to the first requesting set-top box; and at the second requesting set-top box, enabling the one or more identified features contained in the identified software application by sending the data profile from the head-end to the plurality of set-top boxes such that each of the sub-set of requesting set-top boxes uses the second data profile after ascertaining that the profile key contained in the second data profile corresponds to the second requesting set-top box.

2. The method of claim 1, wherein the profile key includes one of a home identification, a zip code or a serial number.

3. The method of claim 2, wherein sending the profile key from the head-end to the plurality of set-top boxes includes selecting the plurality of set-top boxes based on the profile key.

4. The method of claim 1, wherein the software applications comprise computer-executable instructions for executing the software application.

5. The method of claim 1, wherein the identified software application is a diagnostics application.

6. The method of claim 5, wherein the feature selector identifies a first diagnostic level from among a plurality of diagnostic levels at which the diagnostics application is to execute.

7. The method of claim 1, wherein the application identifier key identifies a plurality of client-resident software applications including the identified software application.

8. The method of claim 1, wherein the feature selector identifies a plurality of features for enabling.

9. The method of claim 1, wherein the one or more identified features in the second data profile request that differ from the one or more identified features in the first data profile request include at least one of a weather condition and a traffic condition.

10. The method of claim 1, further comprising receiving the data profile from the requesting set-top box at regular intervals, thereby ensuring the one or more identified features remain enabled.

11. A head-end device operable to enable a particular feature among a plurality of features contained in a software application loaded on a set-top box in a cable system, the set-top box located remotely from the head-end device in the cable system, the head-end device comprising:

a processor;

a memory to store instructions to be executed by the processor, the instructions comprising:

in response to receiving from a first requesting set-top box a first data profile request indicating one or more of the plurality of features contained in a software application to be enabled thereon and receiving from a second requesting set-top box a second data profile request indicating one or more of the plurality of features contained in a software application to be enabled thereon, wherein at least one of the software applications and the one or more features contained therein in the second data profile request differs from at least one of the software applications and the one or more features contained therein in the first data profile request; generating and transmitting a first data profile based on the first data profile request and a second data profile based on the second data profile request, each data profile comprising:

a profile key identifying a sub-set of requesting set-top boxes each having loaded thereon a plurality of software applications for implementing one or more features, an application key identifying a corresponding software application having one or more features to be enabled, and a feature selector identifying the one or more features contained in the software application to be enabled;

enabling the one or more identified features contained in the identified software application on the requesting set-top box by sending the data profile from the head-end to the plurality of set-top boxes such that each of the sub-set of requesting set-top boxes uses the data profile whose profile key contained in the first data profile corresponds to the first requesting set-top box; and enabling the one or more identified features contained in the identified software application on the requesting set-top box by sending the data profile from the head-end to the plurality of set-top boxes such that each of the sub-set of requesting set-top boxes uses the data profile whose profile key contained in the second data profile corresponds to the second requesting set-top box.

12. The head-end device of claim 11, wherein the profile key includes one of a home identification, a zip code or a serial number.

13. The head-end device of claim 11, wherein the sub-set of set-top boxes is selected based on the profile key.

14. The head-end device of claim 11, wherein the software applications comprise computer-executable instructions.

15. The head-end device of claim 11, wherein the identified software application is a diagnostics application.

16. The head-end device of claim 15, wherein the feature selector identifies a first diagnostic level from among a plurality of diagnostic levels at which the diagnostics application is to execute.

17. The apparatus head-end device of claim of claim 11, wherein the application key identifies a plurality of client-resident applications including the identified software application.

18. The apparatus head-end device of claim 17, wherein the feature selector identifies a plurality of features for enabling.

19. The head-end device of claim 11, the instructions further comprising sending a different data profile comprising a different profile key to a different plurality of set-top boxes to enable activate a different feature on a different sub-set of set-top boxes.

20. The head-end device of claim 11, the instructions further comprising receiving the data profile from the requesting set-top box at regular intervals, thereby ensuring the one or more identified features remain enabled.

21. A non-transitory, machine-readable medium having stored thereon a plurality of executable instructions for enabling a particular feature among a plurality of features in a software application loaded on one or more set-top boxes in a cable system, the set-top boxes located remotely from a head-end in the cable system, the plurality of instructions comprising:

in response to receiving from a first requesting set-top box a first data profile request indicating one or more of the plurality of features contained in a software application to be enabled thereon and receiving from a second requesting set-top box a second data profile request indicating one or more of the plurality of features contained in a software application to be enabled thereon, wherein at least one of the software applications and the one or more features contained therein in the second data profile request differs from at least one of the software applications and the one or more features contained therein in the first data profile request; generating and transmitting a first data profile based on the first data profile request and a second data profile based on the second data profile request, each data profile comprising:

a profile key identifying a sub-set of the requesting set-top boxes each having loaded thereon a plurality of software applications for implementing one or more features, an application key identifying a corresponding software application having one or more features to be enabled, and a feature selector identifying the one or more features contained in the software application to be enabled;

enabling the one or more identified features contained in the identified software application on the requesting set-top box by sending the data profile from the head-end to the plurality of set-top boxes such that each of the sub-set of requesting set-top boxes uses the data profile whose profile key contained in the first data profile corresponds to the first requesting set-top box; and enabling the one or more identified features contained in the identified software application on the requesting set-top box by sending the data profile from the head-end to the plurality of set-top boxes such that each of the sub-set of requesting set-top boxes uses the data profile whose profile key contained in the second data profile corresponds to the second requesting set-top box.

* * * * *